3,294,493
METHOD OF SEPARATING URANIUM AND PLUTONIUM
Albert A. Jonke, Elmhurst, Robert K. Steunenberg, Naperville, and Richard C. Vogel, Hinsdale, Ill., assignors to the United States of America as represented by the United States Atomic Energy Commission
No Drawing. Filed Apr. 18, 1966, Ser. No. 544,357
6 Claims. (Cl. 23—324)

The invention described herein was made in the course of, or under, a contract with the United States Atomic Energy Commission.

This invention relates to the reprocessing of nuclear reactor fuels. In more detail the invention relates to a method of separating uranium values from plutonium values in the nuclear fuel, and decontaminating the uranium and plutonium values thus separated. In still more detail, the invention relates to a method of reprocessing uranium dioxide-plutonium dioxide fuel clad in Zircaloy or stainless steel to separate the uranium values from plutonium values, and to purification of these values separately.

It has long been known that plutonium and uranium can be separated by volatility processes. For example, according to one process which has undergone extensive tests, fuel assemblies that have been discharged from a nuclear reactor are charged to a fluid-bed reactor where they are immersed in a bed of high-fired alumina granules or any other powder inert to the gaseous reagents used in the process. In the case of Zircaloy cladding, the cladding is first removed by reaction with HCl gas at a temperature above the sublimation point of $ZrCl_4$ (331° C.). In the case of stainless steel cladding, the cladding is destructively oxidized by exposure to hydrogen fluoride-oxygen mixtures at temperatures of 550 to 650° C. The declad uranium dioxide and plutonium dioxide are unattacked and remain on the fuel support in the reactor in the form of pellets and/or pellet fragments. The fuel is next treated with diluted oxygen in the lower zone of the heated reactor in order to oxidize the uranium dioxide and thereby convert the fuel pieces to a finely powdered mixture of $U_3O_8$ and $PuO_2$. The fuel powder is simultaneously transported by the up-flow of the gas fed at the bottom of the reactor to the upper zone of the bed where fluorine is continuously injected. Fluorination reactions in the upper zone result in the formation of $UF_6$ and $PuF_6$, which are volatized from the reactor and collected in refrigerated traps. Also, the fission product fluorides which are volatile are collected in the refrigerated traps. Excess fluorine gas is recycled in order to conserve fluorine.

The mixture of plutonium and uranium hexafluorides, together with the fission products whose fluorides are volatile, is next revaporized and passed from the cold traps to a vessel in which the less stable $PuF_6$ is thermally decomposed to the nonvolatile $PuF_4$. The $UF_6$ and the remainder of the fluorides pass into cold traps where they are again condensed, and are later fed to fractional distillation columns for separation of the fission product fluorides from the $UF_6$. The impurities, $NpF_6$ and $TcF_6$, which may not be separated by distillation, are removed from the $UF_6$ gas stream by sorption on solid $MgF_2$.

The bulk of the fission products are removed as solid waste in the alumina bed from the primary reactor. Other lower-level radioactive waste streams are removed from various process vessels.

While this process gives good results, it obviously would be advantageous if the separation of uranium and plutonium could be accomplished in conjunction with the fluorination step prior to volatilization from the fluorination reactor. Separation by a selective fluorination process would result in significant simplification of the subsequent process steps—condensation, reevaporation, distillation—since the contamination of $PuF_6$ by fission product fluorides would be reduced and the bulk of the $UF_6$ product would not contaminate the plutonium stream and the bulk of the plutonium product would not contaminate the uranium stream.

It is accordingly an object of the present invention to develop a method for reprocessing nuclear fuel elements which is simpler than known processes.

It is another object of the present invention to develop a method for gas-phase fluorination of $UO_2$–$PuO_2$ and/or $U_3O_8$–$PuO_2$ fragmented or powdered fuels which requires a lower temperature than known processes.

It is a more specific object of the present invention to develop a novel method for reprocessing Zircaloy-clad or stainless-steel-clad uranium dioxide-plutonium dioxide fuel elements.

These and other objects of the present invention are attained by employing gaseous $BrF_5$ or $BrF_3$, or mixtures thereof, to selectively fluorinate uranium to volatile $UF_6$ and plutonium to nonvolatile $PuF_4$ in a fluidized bed whereby uranium is volatilized and removed from the bed and plutonium remains in the bed.

The invention will first be described in general terms and subsequently in more specific language closing with several specific examples. Decladding the fuel elements and pulverizing the fuel pellets are accomplished in known manner as described above. In the first fluorination step, the $U_3O_8$–$PuO_2$ powder is fluorinated with gaseous $BrF_5$ and/or gaseous $BrF_3$ to gaseous $UF_6$ and solid $PuF_4$. The $UF_6$, excess bromine fluorides and reaction product bromine are collected in a condenser. The $UF_6$ and the interhalogens, together with those fission product fluorides which are volatile, are separated by fractional distillation, resulting in a completely decontaminated uranium hexafluoride product. The bromine in the bromine fluoride mixture can be refluorinated to the original bromine fluoride and the resultant bromine fluorides can be recycled.

In a second fluorination step, the plutonium compound ($PuF_4$) remaining in the primary reactor is fluorinated with fluorine gas to $PuF_6$, which is volatilized from the vessel and collected in separate cold traps. After collection, the $PuF_6$ can be revaporized and passed into a heated vessel where it is thermally decomposed to nonvolatile $PuF_4$ product.

As an alternative to the second fluorination step, the plutonium compound remaining in the primary reactor can be discharged along with the bed material, from which the plutonium will be leached with aqueous reagents. The resultant solution containing plutonium will be fed to a purification system comprising solvent extraction or ion exchange to recover plutonium.

The invention will next be described in more detail. A fuel assembly which has been discharged from a nuclear reactor is charged to a fluidized-bed reactor where it is immersed in a bed of high-fired alumina powder or any other inert bed material having a particle size range of approximately 80 to 250μ. In the case of Zircaloy-clad fuel subassemblies, the bed is fluidized with 10 to 80 v/o HCl gas, diluted with nitrogen, at 400° C., the HCl reacting with the cladding to form volatile $ZrCl_4$ which is distilled from the reactor. The fuel pellets do not react but settle to the bottom of the bed. A reaction time of 4 to 6 hours is usually sufficient; however, longer times may be needed depending on the Zircaloy content of the fuel assembly. In the case of stainless-steel-clad fuel assemblies, the bed is fluidized with 40 to 60 v/o hydrogen fluoride in oxygen and the cladding is destroyed. The conditions for decladding the fuel elements were established in prior experiments. The bed containing the fuel pellets is then fluidized with a mixture of oxygen and nitrogen at 400–450° C. to oxidize the uranium dioxide to $U_3O_8$ and thereby reduce the fuel pellets to a powder which is distributed through the bed. An oxygen concentration of 20% to 50% has been found satisfactory. $BrF_5$ and/or $BrF_3$, which may be diluted with nitrogen at a temperature of greater than 150–200° C., is then employed to fluidize the bed. $BrF_5$ and $BrF_3$ react selectively with oxides of uranium and some of the fission products to convert them to volatile fluorides while converting plutonium only to the tetrafluoride. While greater than 99% of the uranium is converted to the hexafluoride, essentially all of the plutonium remains as the tetrafluoride.

Fluorine can be included in the fluorination mixture provided that the proportion included and the conditions used are not such as to cause vaporization of an appreciable proportion of the plutonium. It may be advantageous to include some fluorine—up to perphaps 50 v/o of the mixture—to increase the rate of the reaction and to simplify recycling. It is notable that this reaction proceeds at temperatures as low as 150–200° C. whereas fluorination temperatures in excess of 350° C. were required in the prior art process employing fluorine.

$UF_6$ together with excess bromine fluorides, bromine and some fission products are condensed in a cold trap maintained at Dry Ice temperature which permits some gaseous fission products to escape. The $UF_6$ is then separated from the other compounds by fractional distillation.

The remove plutonium from the fluid bed of alumina particles, the bed is fluidized with a mixture of fluorine and nitrogen for an extended period of time while heating the bed to temperature in excess of 300° C. The preferred heating schedule is as follows: 3 hours at 300° C., 5 hours at increasing temperature from 300 to 550° C. and 2 hours at 550° C., at a fluorine concentration of 90% or higher.

This procedure removes more than 95% of the plutonium from the bed. A greater plutonium recovery can be attained by using the bed of alumina particles for several cycles of the fluidizing operations.

The volatilized $PuF_6$ is then recovered in a cold trap with fission products and excess fluorine passing through the trap. The $PuF_6$ is thermally decomposed to form $PuF_4$ product.

The following experiment illustrates the invention. 0.5-inch diameter by 0.5-inch thick sintered pellets composed nominally of 0.4 w/o plutonium, 86 w/o uranium, and one w/o fission products all in oxide form were supported by a bed of ¼-inch diameter nickel balls to form a packed bed one inch deep in a two-inch diameter fluidized-bed reactor. Inert alumina particles —40 +170 mesh were added to the reactor to form a fluidized bed 12 inches deep above the pellet bed. Cesium fluoride was added to the alumina bed to simulate conditions existing when irradiated fuel is reprocessed. The bed was fluidized with a mixture of oxygen and nitrogen at 400–450° C. for two hours to oxidize the uranium to $U_3O_8$ and reduce the fuel pellets to a powder. The bed was then fluidized with a mixture of $BrF_5$ and nitrogen containing 2–8 v/o $BrF_5$ for thee hours at 400° C. and then fluorinated with recycled fluorine containing 10 v/o nitrogen for one hour at 450° C., three hours at 500° C. and eight hours at 550° C. Both the uranium and plutonium concentrations in the final alumina bed were 0.008 w/o. Analysis of alumina-bed samples taken during the $BrF_5$ fluorination step indicated that 99% of the uranium was converted to $UF_6$ during the initial 1.75 hours of $BrF_5$ fluorination. During the subsequent 1.25 hours of fluorination, the uranium concentration in the alumina fluid bed decreased to 0.051 w/o, indicating that at the end of the $BrF_5$ fluorination 93.8 w/o of the uranium had been converted to $UF_6$. Analysis of the chemical traps used for disposal of the gaseous reagents indicated that no plutonium was volatilized during the $BrF_5$ fluorination.

The following experiment shows the effect of fluorination temperature on extent of conversion of uranium to $UF_6$. In each test 270 grams of $UO_2$ pellets were added to 470 grams of alumina and oxidized to $U_3O_8$ powder by reaction with 30 v/o oxygen in nitrogen for three hours at 400° C. The powdered $U_3O_8$ was fluorinated to $UF_6$ by reaction with 8 to 14 v/o $BrF_5$ in nitrogen for 2.5 hours at temperatures of 380, 290, 200 and 110° C. The uranium concentrations in the final alumina beds were 0.0027, 0.0048, 0.165, and 10 w/o, respectively. It is thus evident that a fluorination temperature of greater than 200° C. is required to assure essentially complete conversion of $U_3O_8$ to $UF_6$ with the $BrF_5$ concentrations used. It is believed that temperatures down to about 150° C. could also be used when fluorinating with $BrF_5$ provided carefully controlled conditions were used. Other tests have shown that temperatures as low as 150° C. can be used when fluorinating with $BrF_3$.

Other tests were made to compare the effects of $BrF_5$ with that of elemental fluorine on uranium oxides and $UF_4$. Surprisingly, it was found that the reaction rate constants for reactions involving $BrF_5$ are higher by an order of magnitude than reactions involving fluorine. It has also been determined that reaction rate constraints for $BrF_3$ are even higher than those for $BrF_5$. Thus $BrF_5$ and $BrF_3$ will both easily fluorinate uranium oxides to $UF_6$ at relatively low temperatures but will not fluorinate plutonium beyond the solid $PuF_4$.

It will be understood that the invention is not to be limited to the details given herein but that it may be modified within the scope of the appended claims.

What is claimed is:

1. A method of separating uranium values and plutonium values, comprising fluorinating said values in a fluidized bed with gaseous bromine pentafluoride, gaseous bromine trifluoride or mixtures thereof at an elevated temperature, whereby uranium hexafluoride is volatilized and plutonium tetrafluoride remains in the bed.

2. A method to claim 1 wherein the volatile uranium hexafluoride is condensed, sublimed and distilled to separate it from fission products and bromine fluorides, and plutonium is recovered from the bed and purified.

3. A method of separating uranium values and plutonium values present together in irradiated nuclear reactor fuel elements, comprising decladding the fuel elements in a fluidized bed of inert granular particles, passing a gas containing oxygen through the bed to disintegrate the fuel, passing a gas containing bromine pentafluoride, bromine trifluoride or mixtures thereof upwardly through the bed at an elevated temperature at a rate sufficient to fluidize the bed, whereby uranium is vaporized as uranium hexafluoride and plutonium is fluorinated to plutonium tetrafluoride which remains in the bed.

4. A method according to claim 3 wherein the fluorinating agent is bromine pentafluoride and the temperature employed is between 200 and 400° C.

5. A method according to claim 3 wherein plutonium is removed from the bed by fluidizing the bed with a gas containing elemental fluorine at a temperature between 300 and 600° C.

6. A method according to claim 3 wherein plutonium is recovered from the bed by dissolving it in aqueous reagents and purifying it by solvent extraction or ion exchange.

References Cited by the Examiner

UNITED STATES PATENTS

| | | | |
|---|---|---|---|
| 3,012,849 | 12/1961 | Horn | 23—326 |
| 3,088,800 | 5/1963 | Johnson et al. | 23—326 |

References Cited by the Applicant

UNITED STATES PATENTS

| | | |
|---|---|---|
| 2,830,873 | 4/1958 | Katz et al. |

OTHER REFERENCES

AEC Report ANL-5633 Chemical Engineering Division Summary Report, July, August, September 1956.

Journal of American Chemical Society, vol. 81, page 6377 (1959).

L. DEWAYNE RUTLEDGE, *Primary Examiner.*

S. TRAUB, *Assistant Examiner.*